A. SONANDER.
SCALE.
APPLICATION FILED AUG. 11, 1919.

1,352,097.

Patented Sept. 7, 1920.
2 SHEETS—SHEET 1.

Witnesses
Oliver W. Holmes

Inventor
Andrew Sonander
By his Attorneys

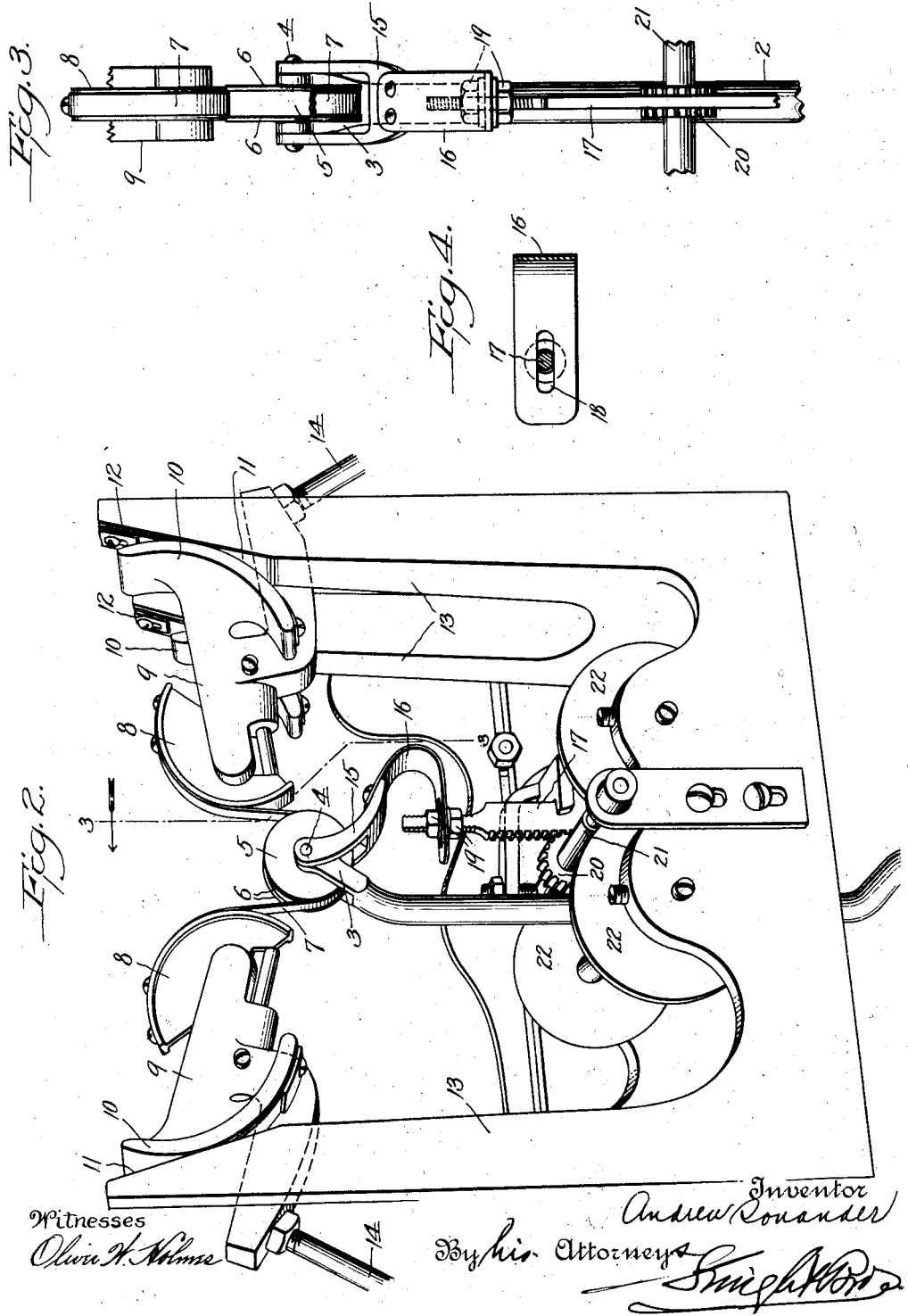

UNITED STATES PATENT OFFICE.

ANDREW SONANDER, OF RUTLAND, VERMONT, ASSIGNOR TO HOWE SCALE COMPANY, OF RUTLAND, VERMONT, A CORPORATION OF VERMONT.

SCALE.

1,352,097.  Specification of Letters Patent.  Patented Sept. 7, 1920.

Application filed August 11, 1919. Serial No. 316,715.

*To all whom it may concern:*

Be it known that I, ANDREW SONANDER, a citizen of the United States, residing at Rutland, county of Rutland, State of Vermont, have invented certain new and useful Improvements in Scales, of which the following is a specification.

This invention relates more especially to automatic scales and has for its object to provide an improved construction, combination, and arrangement of parts for a weighing machine of this character. Toward the attainment of this object, the present invention contemplates an improved connection between the counterbalancing devices and the draft rod and between said draft rod and the rack which drives the indicator for measuring the displacement of the weighing mechanism. The invention furthermore contemplates the elimination of lost motion which is inherent in well known scales which operate on the same general principle. By avoiding a multiplicity of joints which involve lost motion, the weighing machine is made more accurate and durable. Another object of the invention is to provide an improved construction by means of which the forces interacting between the counterbalancing devices, draft rod, and indicator driving rack, as well as those in action between said rack and the indicator pinion, are all confined to the same plane of action. Any tendency for these parts to get out of alinement, is thereby overcome. Other and further objects will appear in the specification and be pointed out in the appended claims, reference being had to the accompanying drawings in which:

Fig. 2 is a perspective view on an enlarged scale of portions shown in Fig. 1;

Fig. 3 is a section on the line 3—3, Fig. 2;

Fig. 4 is a fragmentary detail showing the adjustable connection between the rack and the member by means of which it is suspended from the equalizing rollers.

Figure 1:
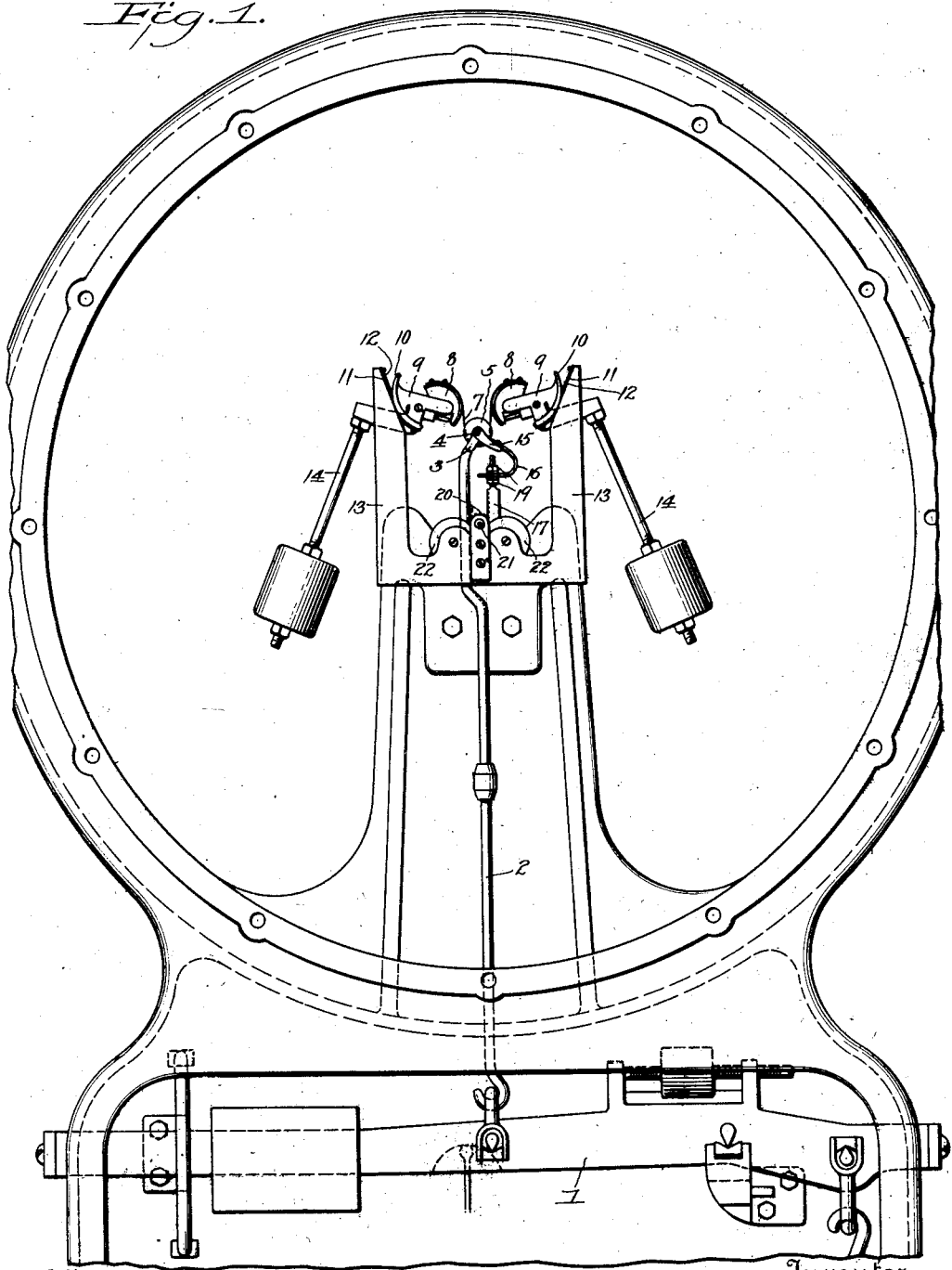
Figure 1 is a view in elevation of the upper portion of an automatic scale constructed in accordance with the principles of the present invention.

Referring more particularly to the drawings, in the embodiment of my invention shown therein, a main lever 1 has connected thereto the lower end of a draft rod 2 which at its upper end is provided with a forked bearing 3. In the spaced arms of said forked upper end is mounted a pin 4 upon which is journaled an equalizing pulley or roller 5 provided with spaced peripheral flanges 6 for retaining a band 7 in the central plane of said pulley or roller 5. The band 7 has its opposite ends secured to cam blocks or segments 8 which are adjustable with respect to rocking levers 9 by which they are carried. Rocking levers 9 are provided with segmental cams 10 which are oscillatably suspended by means of straps 12 on inclined cam faces 11 formed on frame uprights or standards 13. Said straps 12 are secured at their opposite ends to rockers 10 and said cam faces 11. Weighted lever arms 14 are suitably connected to the rocking levers 10 and impart to said levers a tendency to rock upwardly to counteract the downward-pull of draft rod 2. A yoke or bifurcated member 15 has its laterally spaced arms pivotally mounted on the outer ends of pin 4. Secured by its upper end to the member 15, is a flat band spring 16 which constitutes yieldable means for suspending a rack bar 17 from the pulley or roller 5. As shown in Fig. 4, the lower end of the flat band spring is provided with a longitudinal slot 18 through which extends the reduced upper end of the rack bar 17. Said upper end is provided with screw threads for accommodating nuts 19 by means of which said rack bar is secured in position after it has been adjusted into position. The rack bar is held against angular movement and in the central plane of pulley or roller 5 by forming flat surfaces on its threaded upper end, said surfaces slidably engaging the edges of slot 18. Meshing with the rack bar 17, is a pinion 20 mounted on an indicator shaft 21 which is rotatably supported by the bearing rolls 22. It will be understood from the above description that the rack bar 17 which drives the indicator shaft, is connected directly to the draft bar without lost motion due to an extended mechanical train of elements. It will also appear that these parts are centrally disposed with respect to one and the same plane which contains the axes of the draft rod 2 and rack bar 17.

I claim:

1. In a scale, the combination with a counterbalancing device, of a draft rod provided with a roller arranged in a plane containing the axis of said draft rod, a band having running engagement with said roller and connected to said counterbalancing device, a rack bar centrally disposed with respect to said plane, and means yieldably suspending said rack from said roller.

2. In a scale, a draft rod provided with a roller, a weighted arm for counterbalancing the pull of said draft rod, a band engaging cam connected to said weighted arm, a band wrapping on and off of said cam, said roller being suspended by said band, a rack for moving an indicator and means suspended from said roller and yieldingly supporting said rack.

3. In a weighing machine, counterbalancing devices including oppositely arranged segmental cams, a band secured to and wrapping on to and off of said cams, an equalizing roller suspended by said band, a draft rod connected to said roller, a rack bar connected to said roller and a pinion for moving an indicator, geared to said rack bar, said pinion and rack bar being centrally disposed with respect to the central plane of said equalizing roller.

4. In a scale, the combination with a counterbalance device including oppositely arranged involute segments, of a band extending over said segments and having opposite ends thereof partaking of the movements of said segments, an equalizing roller suspended in the bight of said band, a draft bar suspended from said roller, a rack, an indicator shaft provided with a pinion meshing with said rack, and means for suspending said rack from said equalizer roller, said means comprising a bearing member having branched arms pivotally connected to opposite faces of said equalizer roller, and a flat spring secured to said bearing member and having a portion thereof transversely arranged with respect to said rack and secured thereto.

5. In a scale, the combination with a counterbalance device including oppositely arranged involute segments, of a band extending over said segments and having opposite ends thereof partaking of the movements of said segments, an equalizing roller suspended in the bight of said band, a draft bar suspended from said roller, a rack, an indicator shaft provided with a pinion meshing with said rack, and means for suspending said rack from said equalizer roller, said means comprising a bearing member having branched arms pivotally connected to opposite faces of said equalizer roller and a flat spring secured to said bearing member and having a portion thereof transversely arranged with respect to said rack and secured thereto, said portion of the flat spring having an elongated slot centrally arranged with respect to the central plane of said rack and pinion and within which the rack is suspended from said spring.

6. In a weighing machine, a counterbalancing device including oppositely arranged band segments, a band suspended between said segments, an indicator shaft provided with a pinion, a rack meshing with said pinion, a flat spring arranged transversely to said rack and connected thereto, a draft rod, and means for suspending said flat spring and draft rod by means of said band, including a roller supported by said band.

ANDREW SONANDER.